(12) United States Patent
Wyatt

(10) Patent No.: US 8,356,616 B2
(45) Date of Patent: Jan. 22, 2013

(54) FUEL TANK VALVE

(75) Inventor: Alistair David Richfield Wyatt, Somerset (GB)

(73) Assignee: Airbus Operations Limited, Bristol (GB)

( * ) Notice: Subject to any disclaimer, the term of this patent is extended or adjusted under 35 U.S.C. 154(b) by 859 days.

(21) Appl. No.: 12/097,287

(22) PCT Filed: Dec. 14, 2006

(86) PCT No.: PCT/GB2006/004672
§ 371 (c)(1),
(2), (4) Date: Jun. 13, 2008

(87) PCT Pub. No.: WO2007/071932
PCT Pub. Date: Jun. 28, 2007

(65) Prior Publication Data
US 2008/0315038 A1  Dec. 25, 2008

(30) Foreign Application Priority Data
Dec. 22, 2005 (GB) .................................. 0526207.6

(51) Int. Cl.
*F16K 1/44* (2006.01)
*B64D 37/20* (2006.01)
(52) U.S. Cl. ....... 137/1; 137/614.18; 137/172; 137/590; 251/360; 251/144
(58) Field of Classification Search ................... 137/613, 137/614.18, 590, 172, 329.01, 329, 1; 251/144, 251/360, 361
See application file for complete search history.

(56) References Cited

U.S. PATENT DOCUMENTS

| 2,384,628 | A | * | 9/1945 | Krone et al. ................. 137/613 |
| 2,807,281 | A | * | 9/1957 | Allen et al. ................... 251/361 |
| 3,026,070 | A | | 3/1962 | Sutton et al. |
| 3,144,954 | A | | 8/1964 | Brown et al. |
| 3,817,267 | A | * | 6/1974 | Hicks et al. ................... 137/204 |
| 4,880,029 | A | | 11/1989 | Koller |

FOREIGN PATENT DOCUMENTS

| DE | 10318569 B3 | 5/2004 |
| GB | 698140 | 10/1953 |
| GB | 790894 | 2/1958 |
| GB | 871980 | 7/1961 |
| GB | 1031093 | 5/1966 |
| JP | 2003301951 | 10/2003 |

OTHER PUBLICATIONS

UK Search Report for GB0526207.6 dated May 26, 2006.
ISR and Written Opinion for PCT/GB2006/004672 dated Mar. 22, 2007.

* cited by examiner

*Primary Examiner* — Kevin Lee
(74) *Attorney, Agent, or Firm* — Lowe Hauptman Ham & Berner LLP

(57) ABSTRACT

Some water drain valves tend to fill with water which may freeze, thereby jamming the valve. This invention provides an aircraft water drain valve comprising a passageway, a shaft, a first sealing member and a second sealing member. The shaft is moveable between an open position in which the first and second sealing members are arranged to allow free passage of fluid through the passageway, and a closed position in which both the first and second sealing members are arranged to prevent free passage of fluid through the passageway thereby preventing ingress of fluid into the region between the first and second sealing members. Thus water may be hindered from collecting and freezing in the part of the valve close to the cold wall of the fuel tank.

10 Claims, 1 Drawing Sheet

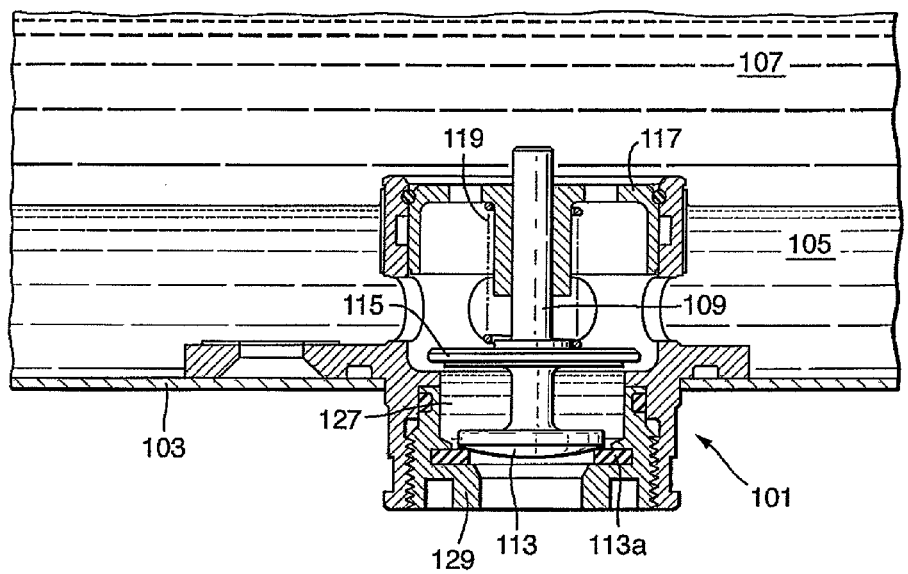
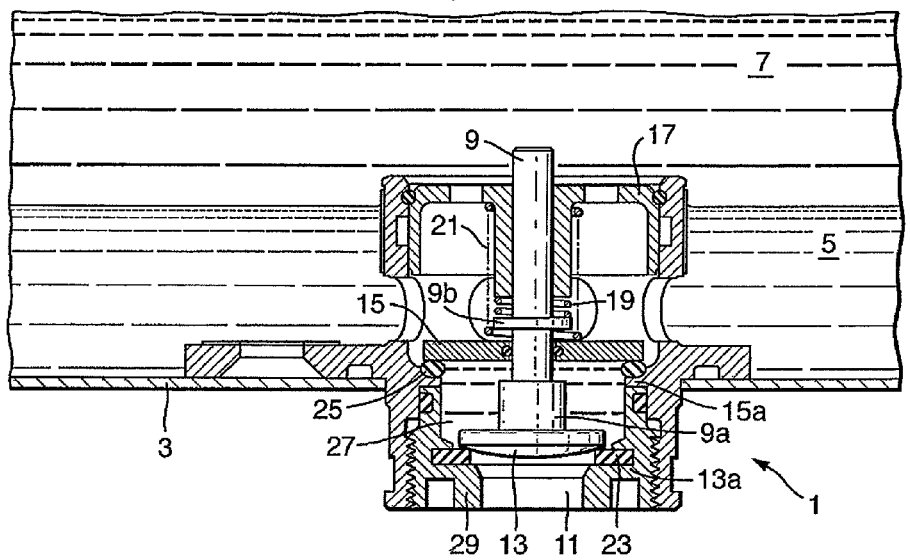

FUEL TANK VALVE

RELATED APPLICATIONS

The present application is based on International Application Number PCT/GB2006/004672 filed Dec. 14, 2006, and claims priority from British Application Number 0526207.6 filed Dec. 22, 2005, the disclosures of which are hereby incorporated by reference herein in their entirety.

TECHNICAL FIELD

The present invention relates to a valve for a fuel tank and more specifically a water drain valve for an aircraft fuel tank.

BACKGROUND OF THE INVENTION

Water tends to collect at the bottom of aircraft fuel tanks, particularly on aircraft which are subjected to significant changes in pressure or humidity. Aircraft may therefore be equipped with a water drain valve through which excess water may be drained.

During flight or in cold weather conditions, an aircraft can experience very low temperatures. This can cause the water close to the cold wall of the fuel tank to freeze. Known water drain valves tend to fill, at least partially, with water and some of this water that is close to the cold wall can freeze, thereby jamming the valve. In this situation the fuel tank cannot be drained and draining must be delayed until the water in the valve has thawed. Any delay or restriction in aircraft maintenance is, of course, undesirable.

SUMMARY OF THE INVENTION

The present invention seeks to remove or mitigate at least one of the above-mentioned problems.

The present invention provides an aircraft water drain valve, the valve comprising a passageway for communicating fluid between the interior and exterior of a fuel tank, a shaft, a first sealing member and a second sealing member, wherein the shaft is moveable between an open position in which the first and second sealing members are arranged to allow free passage of fluid through the passageway, and a closed position in which both the first and second sealing members are arranged to prevent free passage of fluid through the passageway thereby preventing ingress of fluid into the region between the first and second sealing members.

Sealing the space between the first and second sealing members when the valve is shut helps prevent water collecting in that space between maintenance intervals. Thus water may be hindered from collecting and freezing in the part of the valve close to the cold wall of the fuel tank. The present invention aims to thereby provide a valve having improved operability at low temperatures.

The shaft may be slideably moveable between the open and closed positions. The shaft may be mounted co-axially with the passageway. The first and second sealing members may be mounted co-axially with the shaft. The shaft may be resiliently biased towards the closed position. The shaft may be resiliently biased by a spring. The shaft may therefore be moved from the closed position to the open position, for example by ground staff pushing the shaft in a direction against the resilient biasing, but be arranged to revert to the closed position when this force is released.

It will be appreciated that the shaft need not necessarily be in the form of a circular cylinder, and may, in fact, be in any number of forms envisaged by the skilled man.

It will be understood that the sealing members may each be any component that can be arranged to block the passageway. For example, one or both of the sealing members may be in the form of seal plates. The passageway may be of generally circular cross-section. The sealing members may be generally circular, for example disc-shaped. Alternatively, one or both of the sealing members may be in the form of spherical plugs.

The second sealing member may be moveable relative to the first sealing member. The first sealing member may be fixedly mounted on the shaft. The second sealing member may be slideably mounted on the shaft. The second sealing member may be resiliently biased towards a position in which, whilst the shaft is in the closed position the second sealing member is arranged to prevent free passage of fluid through the passageway. The second sealing member may be resiliently biased by a spring. Having the first sealing member biased (together with the shaft) to its closed position, and the second sealing member biased to its closed position helps to ensure a good sealing by both members because the relative movement between the first and second sealing members can compensate for changes in the shape of the seals over time.

Alternatively, the second sealing member may be fixedly mounted on the shaft, and the first sealing member may be slideably mounted on the shaft. In which case, the first sealing member may be resiliently biased, for example by a spring, towards a position in which whilst the shaft is in the closed position the first sealing member is arranged to prevent free passage of fluid through the passageway.

The valve may comprise a housing. The housing may, at least in part, define the passageway. The housing may comprise a first valve seat with which, whilst the shaft is in the closed position, the first sealing member abuts. The housing may comprise a second valve seat with which, whilst the shaft is in the closed position, the second sealing member abuts.

It will be understood that a seal may be created between two rigid parts (for example between a metal surface of the first sealing member and a metal valve seat) but that a seal is more effectively created between compliant members. The valve, and more preferably the first valve seat, may comprise a first compliant member, wherein the first compliant member is arranged, whilst the valve is in the closed position, to co-operate with the first sealing member. Alternatively or additionally, the valve, and more preferably the second valve seat, may comprise a second compliant member, wherein the second compliant member is arranged, whilst the valve is in the closed position, to co-operate with the second sealing member. The first sealing member may comprise a compliant member. Alternatively or additionally, the second sealing member may comprise a compliant member. The compliant member(s) may, for example, be in the form of a rubber O-ring.

The portion of the housing containing the first valve seat may be detachable from the remainder of the valve. The portion may therefore be removed, for example for inspection or replacement. When the portion is removed, the second sealing member may prevent free passage of fluid through the passageway.

According to another aspect of the present invention, there is provided an aircraft fuel tank comprising a water drain valve as described herein.

According to yet another aspect of the present invention there is provided an aircraft comprising the above-mentioned fuel tank.

According to yet another aspect of the present invention, there is provided a method of draining water from the above-mentioned aircraft, the method comprising the steps of moving the valve shaft from the closed position to the open position, allowing water to drain from the aircraft fuel tank, and then allowing the shaft to move from the open position to the closed position.

According to yet another aspect of the present invention there is provided a method of draining water from an aircraft fuel tank through a water drain valve, the method comprising the steps of moving a first and a second sealing member in the water drain valve so as to allow free passage of fluid through a passageway in the water drain valve, allowing water to drain from the aircraft fuel tank through the passageway, and then allowing the first and a second sealing members to move to a position in which both the first and second sealing members are arranged to prevent free passage of fluid through the passageway thereby preventing ingress of fluid into the region between the first and second sealing members.

According to a further aspect of the invention, there is provided an aircraft water drain valve, the valve comprising a passageway for communicating fluid between the interior and exterior of a fuel tank, a first sealing member and a second sealing member, wherein the valve is operable between an open state in which the first and second sealing members are arranged to allow free passage of fluid through the passageway, and a closed state in which both the first and second sealing members are arranged to prevent free passage of fluid through the passageway thereby preventing ingress of fluid into the region between the first and second sealing members.

It will be understood that features described herein with reference to one aspect of the invention may equally be applied to any other aspect of the invention.

DESCRIPTION OF THE DRAWINGS

Various embodiments of the invention will now be described, by way of example only, with reference to the accompanying schematic drawings of which:

FIG. 1 is a sectional view of a known water drain valve; and

FIG. 2 is a sectional view of a valve according to a first embodiment of the invention.

DETAILED DESCRIPTION

FIG. 1 shows a known water drain valve 101. The valve is mounted in the wall of an aircraft fuel tank 103, typically at the lowest point in the tank. The fuel tank contains water 105 and fuel 107. Since water is denser than aviation fuel, the water 105 in the fuel tank is located at the bottom of the tank and can separated from the fuel by draining through the valve 101 under the action of gravity.

The water drain valve 101 comprises a housing 117 and a shaft 109 slideably mounted in the housing. A first disc-shaped seal plate 113 is fixedly mounted on the bottom of the shaft 109, and a second disc-shaped seal plate 115 is fixedly mounted mid-way along the shaft 109. Both the seal plates are mounted co-axially with the shaft.

The shaft (and thus the first seal plate) is biased in a downward direction by a spring 119 (shown in FIG. 1 as a broken line) such that the first seal plate 113 abuts a rubber seal 113a located in the base of the valve 101. The second seal plate is mounted on the shaft at such a height that it does not, during normal use, contact the housing. Water is therefore free to flow through the gap between the second seal plate and the housing and to collect between the first and second seal plates.

The lower portion of the housing 117 containing the rubber seal 113a associated with the first seal plate is detachable from the remainder of the housing so that it can be inspected or replaced. Although the second seal plate does not contact the housing during normal use, it is arranged to form a temporary seal with the housing when the lower portion 129 of the housing is removed. In such circumstances the spring 119 pushes the shaft, and thus the fixedly mounted second seal plate, downwards. The second seal plate contacts the housing forming a temporary seal until the lower portion of the housing is replaced.

In FIG. 1, the valve is shown in the closed position. When the water is to be drained from the tank, a tool is inserted into the valve outlet from below and the shaft 109 is pushed upwards, thereby lifting the first seal plate 113 off a rubber seal 113a located in the base of the valve 101. Water 105 then flows out of the fuel tank through the gap between the first seal plate 113 and the housing 117.

When the water has all been drained and fuel begins to drain out of the valve in place of the water, the shaft 109 is released and the first seal plate 113 returns to its original position abutting the valve seat under the action of a spring 119, thereby closing the valve.

Water drain valves may, during flight and/or in harsh weather conditions, experience very low temperatures causing any water in proximity to the exterior of the aircraft to freeze. In the above-described water drain valve of the prior art, the water collected between the first 113 and second seal plate 115 often freezes (even though the rest of the water in the tank may not), thereby jamming the valve 101 and making draining the fuel tank extremely difficult.

FIG. 2 shows a water drain valve 1 according to one embodiment of the present invention. In a similar fashion to the above-mentioned known water drain valve, the valve 1 is mounted in the wall of an aircraft fuel tank 3. The fuel tank contains water 5 and fuel 7, the water 5 being at the bottom of the tank and therefore being able to be drained through the valve 1 under the action of gravity, before the fuel 7.

The valve 1 comprises a shaft 9, a passageway 11, a first seal plate 13 and a second seal plate 15. The passageway is defined by the housing 17 and communicates between the inside of the fuel tank and the exterior of the aircraft. The shaft 9 is slideably mounted in the housing 17. The first seal plate 13 is fixedly mounted on the lower end of the shaft 9 and the second seal plate 15 is slideably mounted on the shaft 9 between two flanges 9a, 9b.

The valve further includes two springs 19 and 21 (spring 21 is shown as a broken line in FIG. 2). The shaft spring 19 is located between the housing 17 and the shaft 9, and biases the shaft downwards into the position shown in FIG. 2 in which the first seal plate 13 abuts against a first seal plate seat 13a. The spring 21 associated with the secondary seal plate is located between the housing 17 and the second seal plate 15 and biases the second seal plate 15 in a downward direction into the position shown in FIG. 2 in which the second seal plate abuts against a second seal plate seat 15a.

The valve 1 also includes two compliant seals 23 and 25, both of which are in the form of a rubber O-ring and are located on the first seal plate seat 13a and the second seal plate seat 15a, respectively.

In FIG. 2, the shaft 9 is shown in the closed position in which the first seal plate 13 abuts the first seal plate seat 13a. In contrast to the water drain valve of FIG. 1, the spring 21 associated with the second seal plate pushes the second seal plate 15 down against the second seal plate seat 15a, thereby defining a chamber 27. Ingress of fluid into the region between the first and second sealing members is therefore prevented.

During flight, the shaft 9 is in the closed position, as shown in FIG. 2, however when the aircraft is on the ground, the valve 1 may be actuated to drain water 5 from the fuel tanks.

To drain the water 5, the shaft is pressed upwards (for example by a member of the ground staff) from the closed position to the open position. The first seal plate 13, which is fixedly mounted to the shaft 9, follows the movement of the shaft 9 and lifts off the O-ring of the seal seat 13a. As the shaft 9 moves further upwards, the lower flange 9a pushes against the second seal plate 15, raising that plate 15 above its seal seat 15a. The shaft is then in the open position and the seal plates are positioned to allow free movement of fluid through the passageway 11 such that the water begins to flows out of the fuel tank. When the drain valve operator detects that fuel is beginning to drain out instead of water the operator releases the upward pressure he was exerting on the shaft.

The shaft spring 19 moves the shaft 9 downwards until the first seal plate 13 abuts its seal seat 13a. The second seal plate 15 is also moved downwards by its associated spring 21, such that it abuts its seal seat 15a. In this embodiment, the arrangement of the shaft and plates, and the biasing of the springs, is such that the second seal is formed just before the first seal. The chamber 27 is partially filled with fuel, the remainder of the volume being occupied by air.

During subsequent flights, water may again collect in the fuel tank. However, in contrast to the water drain valve described with reference to FIG. 1, the water does not reach the region of the valve closest to the aircraft exterior because the water cannot enter the region between the first and second seal plates. Therefore, the valve tends not to suffer from seizure due to ice formation.

The lower half of the valve which encompasses the first seal plate seat 13a and associated O-ring is releaseably connected to the remainder of the housing. Occasionally, this seal assembly 29 may need to be removed, for example for inspection or repair of the O-ring 23. The second seal plate seat 15a is located in the main body of the valve above the assembly 29 containing the first seal plate seat 13a. When the assembly is removed, the second seal plate 15 therefore acts as a back-up seal to the first seal plate 13 and prevents fluid leaking out of the valve 1.

Whilst the present invention has been described and illustrated with reference to a particular embodiment, it will be appreciated by those of ordinary skill in the art that the invention lends itself to many different variations not specifically illustrated herein. By way of example, certain variations to the above-described embodiment will now be described.

The valve may be arranged such that substantially no fuel becomes trapped in the chamber whilst the shaft is in the closed position. Such an arrangement may be achieved by, for example, damping the movement of the shaft spring. The valve may be arranged such that the chamber is substantially full of fuel whilst the shaft is in the closed position. Such an arrangement may be achieved by, for example, damping the spring associated with the second seal plate. The resilient biasing means need not be in the form of a spring. For example the biasing means may be a flexible rubber member.

The sealing members may not necessarily be mounted on a shaft. For example, the valve may comprise an actuator for moving the sealing members in such a way as to operate the valve between the open and closed states.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft water drain valve, the valve comprising a passageway for communicating fluid between the interior and exterior of a fuel tank, a shaft, a first sealing member and a second sealing member, wherein the first and second sealing members are mounted on the shaft and the shaft is moveable between an open position in which the first and second sealing members are arranged to allow free passage of fluid through the passageway, and a closed position in which both the first and second sealing members are arranged to prevent free passage of fluid through the passageway thereby preventing ingress of fluid into the region between the first and second sealing members.

2. A valve according to claim 1 wherein the shaft is resiliently biased towards the closed position.

3. A valve according to claim 1 wherein the second sealing member is moveable relative to the first sealing member.

4. A valve according to claim 3 wherein the second sealing member is slideably mounted on the shaft.

5. A valve according to claim 1, wherein the second sealing member is resiliently biased towards a position in which whilst the shaft is in the closed position the second sealing member is arranged to prevent free passage of fluid through the passageway.

6. A valve according to claim 1, further comprising a first compliant member and a second compliant member, the first and second members being arranged, whilst the shaft is in the closed position, to co-operate with the first and second sealing members respectively.

7. A valve according to claim 1, further comprising a housing, the housing comprising a first valve seat and a second valve seat with which, whilst the shaft is in the closed position, the first and second sealing members abut respectively, wherein the portion of the housing containing the first valve seat is detachable from the remainder of the valve.

8. An aircraft fuel tank comprising a water drain valve according to claim 1.

9. An aircraft comprising a fuel tank according to claim 8.

10. A method of draining water from an aircraft fuel tank through a water drain valve, the method comprising the steps of:
(i) moving a shaft in the water drain valve to an open position, the shaft having first and second sealing members mounted thereon, such that movement of the shaft to the open position enables the first and the second sealing members in the water drain valve to allow free passage of fluid through a passageway in the water drain valve,
(ii) allowing water to drain from the aircraft fuel tank through the passageway, and then
(iii) allowing the first and a second sealing members to move to a position in which both the first and second sealing members are arranged to prevent free passage of fluid through the passageway thereby preventing ingress of fluid into the region between the first and second sealing members.

* * * * *